(12) United States Patent
Ahmed (10) Patent No.: US 11,313,842 B2
(45) Date of Patent: Apr. 26, 2022

(54) SEPARATION METHOD USING AN ION EXCHANGER AND A DRAW SOLUTION COMPRISING ADSORBER PARTICLES

(71) Applicant: Oxford University Innovation Limited, Oxford (GB)

(72) Inventor: Imad Ahmed, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 108 days.

(21) Appl. No.: 16/621,269

(22) PCT Filed: Jun. 12, 2018

(86) PCT No.: PCT/EP2018/065455
§ 371 (c)(1),
(2) Date: Dec. 11, 2019

(87) PCT Pub. No.: WO2018/229031
PCT Pub. Date: Dec. 20, 2018

(65) Prior Publication Data
US 2020/0158704 A1    May 21, 2020

(30) Foreign Application Priority Data
Jun. 12, 2017  (GB) .................................... 1709306

(51) Int. Cl.
*B01D 15/20*   (2006.01)
*B01D 15/36*   (2006.01)
(Continued)

(52) U.S. Cl.
CPC ........... *G01N 30/96* (2013.01); *B01D 15/203* (2013.01); *B01D 15/361* (2013.01);
(Continued)

(58) Field of Classification Search
CPC .... B01D 15/203; B01D 15/361; B01D 69/02; B01D 2311/2607; B01D 2311/2626;
(Continued)

(56) References Cited

U.S. PATENT DOCUMENTS

| 6,395,069 B1 | 5/2002 | Moreau |
| 2004/0045350 A1 | 3/2004 | Jones et al. |

(Continued)

FOREIGN PATENT DOCUMENTS

| CN | 106396033 A | 2/2017 |
| EP | 3 130 391 A1 | 2/2017 |

(Continued)

OTHER PUBLICATIONS

International Search Report for PCT/EP2018/065455, dated Oct. 9, 2018, pp. 1-15.
UK Search Report for GB1709306.3, dated Mar. 6, 2018, pp. 1-3.

*Primary Examiner* — Benjamin L Lebron
(74) *Attorney, Agent, or Firm* — Thomas |Horstemeyer, LLP (57) ABSTRACT

A method for separating ionic species from an analyte solution to form a fractionated sample, the method comprising contacting the analyte solution with an ion-exchanger that is selectively permeable to ionic species of either a positive or negative charge, contacting an opposing side of the ion-exchanger with a draw solution, wherein the draw solution comprises adsorber particles dispersed in a liquid carrier, establishing a concentration gradient across the ion-exchanger to allow at least some ionic species from the analyte solution to permeate through the ion-exchanger to the draw solution, adsorbing ionic species that permeate from the analyte solution onto the adsorber particles, separating adsorber particles having the ionic species adsorbed thereto from at least part of the draw solution, and eluting the (Continued)

ionic species from the separated adsorber particles to form a fractionated analyte sample comprising eluted ionic species.

20 Claims, 6 Drawing Sheets

(51) Int. Cl.
- *B01D 61/00* (2006.01)
- *B01D 69/02* (2006.01)
- *B03C 1/28* (2006.01)
- *B03C 1/30* (2006.01)
- *B82Y 25/00* (2011.01)
- *G01N 30/96* (2006.01)

(52) U.S. Cl.
CPC ........... *B01D 61/002* (2013.01); *B01D 69/02* (2013.01); *B03C 1/28* (2013.01); *B03C 1/30* (2013.01); *B01D 2311/2607* (2013.01); *B01D 2311/2626* (2013.01); *B01D 2325/42* (2013.01); *B03C 2201/20* (2013.01); *B82Y 25/00* (2013.01)

(58) Field of Classification Search
CPC .... B01D 2325/42; B01D 61/002; B03C 1/28; B03C 1/30; B03C 2201/20; B82Y 25/00; G01N 30/96

See application file for complete search history.

(56) References Cited

U.S. PATENT DOCUMENTS

| | | | | |
|---|---|---|---|---|
| 2005/0215687 | A1* | 9/2005 | Hatton | C08K 9/08 524/431 |
| 2009/0127200 | A1* | 5/2009 | Dasgupta | B01J 49/57 210/659 |
| 2012/0135080 | A1* | 5/2012 | Bromberg | B82Y 40/00 424/490 |
| 2014/0076809 | A1* | 3/2014 | Lee | C02F 1/488 210/638 |
| 2017/0044030 | A1* | 2/2017 | Alamaru | B01D 71/56 |
| 2017/0128931 | A1* | 5/2017 | Kaminaga | C08F 8/32 |

FOREIGN PATENT DOCUMENTS

| | | |
|---|---|---|
| GB | 1 556 050 | 11/1979 |
| WO | 2005/076938 A2 | 8/2005 |
| WO | 2016/027280 A2 | 2/2016 |

\* cited by examiner

FIG. 7

SEPARATION METHOD USING AN ION EXCHANGER AND A DRAW SOLUTION COMPRISING ADSORBER PARTICLES

CROSS-REFERENCE TO RELATED APPLICATIONS

This application is the National Stage of International Application No. PCT/EP2018/065455, filed Jun. 12, 2018, which claims the priority to GB 1709306.3, filed Jun. 12, 2017, which are entirely incorporated herein by reference.

This disclosure relates to a method for separating ionic species from an analyte solution. The disclosure also relates to a device for performing such a method, as well as a kit comprising a plurality of such devices.

BACKGROUND

Some elements form a variety of chemical species in solution depending on their available oxidation states. For example, in natural systems, chromium may occur mainly as $Cr^{VI}$ and $Cr^{III}$ species whereas arsenic may form more diverse species, for example, $As^V$, $As^{III}$, $As^0$, and $As^{-III}$. The determination of the total concentration of a given element in an analyte sample may be important in certain circumstances. However, because of the large differences in chemical compositions in environmental systems or waste media, it may not be possible to directly compare element toxicity results based on total concentrations. In the case of chromium, for instance, the water-soluble $Cr^{VI}$ species is more toxic than the sparingly water-soluble $Cr^{III}$ species. To obtain a better understanding of the toxicity of a chromium-containing analyte sample, therefore, chemical speciation analysis may be required.

One method of chemical speciation analysis is LC-MS. Here, a sample is separated by liquid chromatography (LC) to separate the chemical species of interest. The separated fractions are then analysed by mass spectrometry (MS). In many instances, however, separation by chromatography requires arduous column preparation steps and lengthy elution procedures, which vary with instrument type, temperature and column ageing. This makes the approach unsuitable for certain high throughput applications. Moreover, selectivity and matrix suppression effects may be a concern. More critically, the maintenance of chemical character, for example redox properties of air- or temperature-sensitive compounds, and the original distribution of equilibrium-related chemical species in a sample may not be guaranteed by the LC-MS.

BRIEF DESCRIPTION OF THE DRAWINGS

Embodiments of the invention are further described hereinafter with reference to the accompanying drawings, in which.

DETAILED DESCRIPTION

In accordance with the present invention, there is provided a method for separating ionic species from an analyte solution to form a fractionated analyte sample. The method comprises contacting the analyte solution with an ion-exchanger that is selectively permeable to ionic species of either a positive or negative charge. An opposing side of the ion-exchanger is contacted with a draw solution that comprises adsorber particles dispersed in a liquid carrier. A concentration gradient is established across the ion-exchanger to allow at least some ionic species from the analyte solution to permeate through the ion-exchanger to the draw solution. Ionic species that permeate from the analyte solution are adsorbed onto the adsorber particles. The adsorber particles having the ionic species adsorbed thereto are then separated from at least part of the draw solution. Ionic species are then eluted from the separated adsorber particles to form a fractionated analyte sample comprising eluted ionic species. The fractionated sample may be further analysed, for example, by ICPMS. The whole fractionation processes may be carried out in an automated fashion without the analyst intervention.

The fractionated sample may comprise a mixture of ionic species, for example, a mixture of ionic species of a metal or metalloid element. Alternatively, the fractionated sample may be a speciated sample, for example, consisting essentially of a single or a group of chemical species, for example, free ions of $Cu^{2+}$, $Zn^{2+}$ and $Ni^{2+}$ in one fractioned sample.

The adsorber particles may be magnetic particles. The magnetic particles may be separated from at least part of the draw solution by the application of a magnetic field, for example, using an electromagnet. In one embodiment, the magnetic particles may be separated from at least part of the draw solution by the application of a first magnetic field, and then localised in an elution zone by the application of a second magnetic field. Elution of the ionic species from the separated adsorber particles may take place in the elution zone, for example, in a zone that is separate from the ion-exchanger.

In a further aspect of the present invention, there is provided a separation device comprising an analyte chamber having an inlet for the introduction of an analyte solution into the analyte chamber; a permeate chamber having an inlet for the introduction of a draw solution comprising magnetic particles dispersed in a liquid carrier into the permeate chamber; an ion exchanger separating the analyte chamber from the permeate chamber; and an electromagnet positioned downstream of the permeate chamber. The electromagnet is operable to apply a magnetic field downstream of the permeate chamber to separate the magnetic particles from at least part of the draw solution in the permeate chamber. A further electromagnet may be provided downstream of the first electromagnet to localise the separated magnetic particles in an elution zone where the adsorbed ionic species may be eluted from the separated magnetic particles. Once elution has occurred, the magnetic particles may be recycled directly or indirectly to the analyte chamber, for example, for re-use.

In yet a further aspect of the present invention, a kit comprising an array of such devices is provided. This array of devices may be designed so as to allow serial or successive separation of different species from an analyse sample of different charges or properties (for example, organic vs inorganic species).

By adsorbing the ionic species that permeate from the analyte onto the adsorber particles and then separating the adsorber particles from the draw solution, it is possible to maintain an enhanced concentration gradient across the ion-exchanger. This can allow the separation of ionic species to be performed at an enhanced rate, increasing the throughput and separation efficiency of the process. In a preferred embodiment, the system is dynamic. The rate of separation may be controlled by adjusting the rate at which the adsorber particles are removed from draw solution and, optionally, eluted. The adsorption of the ionic species onto the adsorber particles is a key pre-concentration procedure of the ionic species, extending the dynamic range of the analytical technique, for instance mass spectrometry, and allowing the ionic species to be concentrated in the fractionated sample produced. This pre-concentration step may be useful when the chemical species present at concentration levels below the detection limits due to unfavourable signal to noise ratios or where sample matrix interferences are variable precluding reliable analysis.

Adsorber Particles

Any suitable adsorber particles may be used. However, as mentioned above, the adsorber particles are preferably magnetic particles. The magnetic particles may be synthesised by any suitable method, for example by sol-gel approach. The particles may be formed of magnetite, maghemite, jacobsite ($MnFe_2O_4$), trevorite ($NiFe_2O_4$), magnesioferrite ($MgFe_2O_4$), awaruite ($Ni_2Fe$), wairauite (CoFe), ulvospinel ($Fe_2TiO_4$), and ilmenite ($FeTiO_3$). Other metal ferrites, for example, Sr-, Ba-, Co-, Mn-, Zn-, Nd-, Sm-ferrites or any combination thereof may also be employed. The magnetic particles may be synthesised at submicron sizes suitable for enhanced adsorption and magnetic properties.

The magnetic particles may comprise a magnetic core. The core may comprise any of the ferrites mentioned above or a combination thereof. In some examples, the magnetic particles may comprise a magnetic core surrounded by a shell. The shell may be formed from any suitable material, for example, silicon dioxide, titanium dioxide, zirconium dioxide, manganese dioxide, graphene, low molecular compounds or any polymeric material. The shell material may provide improved resistance against particle dissolution during the elution step.

The magnetic particles may be prepared using any suitable method. For example, where the magnetic particles have a core-shell structure, the particles may be formed by reacting a dispersion of, for example, magnetic core particles with shell material or a shell precursor. The reaction may cause a coating or shell to form around the magnetic core particles.

In one example, a dispersion of e.g. magnetite particles may be formed by reacting an iron (III) solution with ethylene glycol and n-octalamine and water at elevated temperature (e.g. 150 to 180 degrees C.). An alkyl orthosilicate, for example, tetraethyl orthosilicate may be added to the dispersion and reacted e.g. at high pH to form silica shell over the core particles. In another example, magnetite may be reacted with acidic permanganate solution, for instance, under reflux, to produce particles with a magnetite core and a manganese oxide shell. Other materials may be applied as a shell around the magnetic cores using similar approaches or techniques that are well known in the art.

Figure 1:
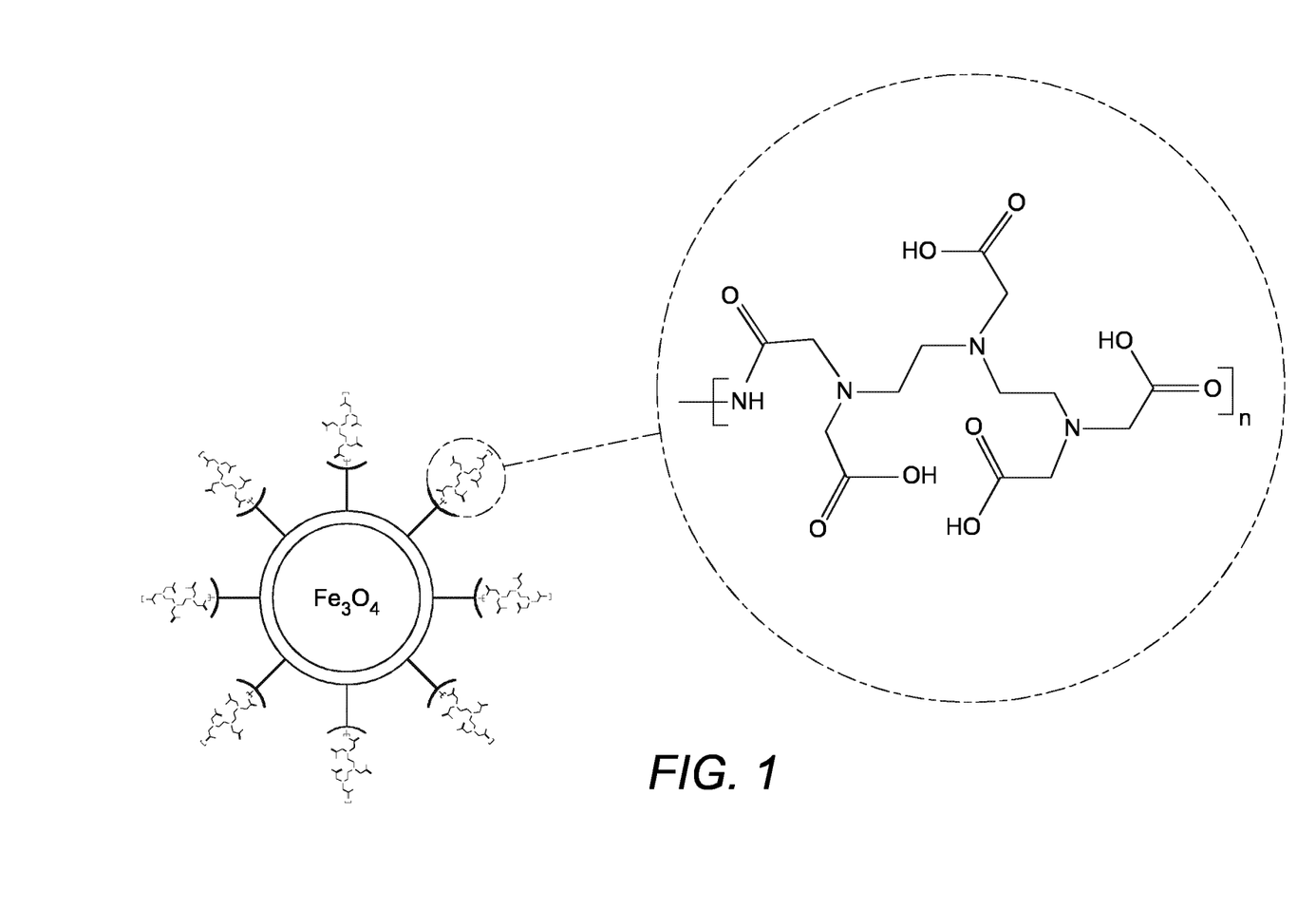
FIG. 1 is a schematic illustration of an example of a functionalised adsorber particle that may be used in a method according to an example of the present invention.

The magnetic particles may be functionalised, for example, with functional groups that selectively bind ionic species that permeate through the ion exchanger from the analyte solution. Where the magnetic particles comprise a core-shell structure, the shell may be functionalised with functional groups that selectively bind ionic species that permeate through the ion exchanger from the analyte solution. Alternatively, where the magnetic particles are not coated with a shell material, the particles may be functionalised with functional groups that selectively bind ionic species that permeate through the ion exchanger from the analyte solution. Suitable functional groups include hydroxyl, carboxylic, phenolic, ether, amine, amide, azo, nitroso, nitrile, disulfide, thioether, thiocarbamate, thiol, azide, phosphoryl, carbonyl. An example of amino/carboxylic groups of an EDTA-like molecule grafted to magnetite core with a suitable shell is shown in FIG. 1.

Preferably, the functional groups may be chelating groups. Examples of suitable functional groups include hydroxyl groups (e.g., polysaccharides, polyethylene glycol), carboxylic groups (e.g., polyacrylic acid, citrate), amine groups (e.g., polyethyleneimine), amino/carboxylic groups (e.g., EDTA, DTPA, IDA, NTA which are common chelators for most transition and rare-earth metals), carboxylic/thiol (such as in dimercaptosuccinic acid and 2,3-Dimercapto-1-propanesulfonic acid (e.g. suitable for arsenic and mercury), diazeniumdiolate group (e.g., desferrioxamine which is a selective chelator for Fe and Al). Two or more of simple chelating functional groups may form a complex functional groups such as iminodiacetic acid and tri-isobutylphosphine sulphide groups.

Any suitable method may be employed to functionalise the magnetic particles. Modification of the particle surface with specific chelating functional groups, simple such as amine or carboxylic or complex such as iminodiacetic acid groups, can be performed either by impregnation or loaded sorbent (physical adsorption) or functionalisation of the sorbent (chemical adsorption). For example, magnetic particles (e.g. magnetite particles) may be functionalised with meso-2,3-dimercaptosuccinic acid (DMSA) by simple mixing of the bare magnetite particles with DMSA in a mixture of toluene and dimethylsulfoxide. In an alternative example, magnetic particles comprising magnetic cores surrounded by silica shells may be functionalised by reaction with N-[(3-Trimethoxysilyl)propyl]ethylenediamine triacetic acid trisodium salt (TMS-EDTA). The resulting magnetic particle may be functionalised with TMS-EDTA.

By altering the functional group or varying the pH of the draw solution, it may be possible to selectively adsorb different ionic species from the analyte solution. For example, adsorbent particles coated with triisobutylphosphine sulphide functional groups are highly selective to gold and palladium in acidic media; at such condition, the particles do not adsorb any transition metal or any other Nobel metals such as Pt, Rh or Ir.

The adsorber particles may have a particle size of 20 to 500 nm, preferably, 50 to 200 nm, more preferably 50 to 100 nm. In some examples, the adsorber particles are nanoparticles. The nanoparticles may have particle sizes of 50 to <100 nm, preferably. Particle size may be determined by laser diffraction spectroscopy.

For an average particle size of 100 nm the particle density in 100 mg of magnetite is ~4.7E+12 which provides a huge adsorption surface area of ~5830 cm², assuming spherical morphology and limited aggregation. By tailoring the adsorber particle size and morphology, the mass of adsorber particles in draw solution and its adsorption capacity can be determined depending on the available analyte concentration. Preferably, the mass of adsorber particles may be of 50-500 mg depending on the density of the chosen core material.

Analyte Solution

The method and device of the present invention may be employed to separate ionic species from any analyte solution. In some examples, the method and device of the present invention may be employed to facilitate toxicological studies and environmental monitoring, for instance, of water sources and waste streams. Alternatively, the method and device of the present invention may be employed to facilitate forensic studies (e.g. arsenic and tellurium in human tissues), plant toxicology (e.g., metals in plant fluids such as in tomato), biochemical analysis, for instance, of biological samples, such as breast milk (and animal milk), blood, serum, plasma, saliva or urine. Further, the method and device provide a suitable approach and environment for analysing intermediate, air-sensitive (e.g., samples containing $Fe^{2+}$, $Co^{2+}$ or $Mn^{2+}$ species and Cr(II)- and Cu(I)-acetylacetonate), temperature or light-sensitive (e.g., Rh and Ir complexes) species.

The analyte solution may be aqueous or non-aqueous. Where the analyte solution is aqueous, other non-aqueous or organic solvents, for example, alcohols and carboxylic acids may be present. However, if present, the organic solvents are present in an amount of less than 50 weight %, for example, less than 20 weight. Preferably, the analyte solution is an aqueous solution. Examples of aqueous solutions that may be analysed using the method and device of the present invention include groundwater, river water, seawater, brackish water, pond water, reservoir water, lake water, waste water, sewage and biological samples. Examples of waste water include industrial, household and agricultural waste streams. Examples of industrial waste water include waste streams from metal and mining industries; oil and gas industries; nuclear reactors; food and beverage industries; pharmaceutical and chemical industries; and automotive industries.

Other examples of suitable analyte solutions include soil pore water, digested (in acid or other chemical) soil, sediment or rock samples; industrial effluents; digested food products, digested biological tissues and hair.

The analyte solution may contain ionic metal and/or ionic metalloid species. These species may be dissolved or dispersed in the analyte solution. Suitable ionic species include species containing toxic heavy metals and/or toxic metalloids. Examples of heavy metals include transition metals as well as rare earth metals. Specific examples include one or more of chromium, mercury, titanium, antimony, iron, manganese, vanadium, lead, cobalt, cadmium, boron, iodine, tin, arsenic, selenium, antimony, tellurium, gadolinium, thallium, lanthanum, cerium, dysprosium, erbium, europium, gadolinium, holmium, lanthanum, lutetium, neodymium, praseodymium, promethium, samarium, scandium, terbium, thulium, ytterbium and yttrium species. Preferably, the ionic species are ionic species of metals and metalloids selected from at least one of cadmium, mercury, lead, manganese, chromium, cobalt, nickel, iron, copper, vanadium, molybdenum, zinc, silver, boron, tin, arsenic, selenium, antimony and/or thallium. Examples of radioactive elements include uranium, technetium, thorium, strontium (e.g. $^{90}Sr$), thorium, cadmium ($^{109}Cd$) and caesium (e.g. $^{137}Cs$).

The metal or metalloids may form different species in water. The table below provides examples of common arsenic, mercury and selenium species that may be formed.

| Element | Common redox states and chemical species |
|---|---|
| M=Cu, Co, Ni, Zn, Cd, Mn, Fe | $M^{2+}$, $MHCO_3^+$, $M(CO_3)_2^{2-}$, $MCO_3^0$, $MOH^+$, $M(OH)_2^0$, $M(OH)_3^-$, $M(OH)_4^{2-}$, $MCl^+$, $MCl_2^0$, $MCl_3^-$, $MHSO_4^+$, $MSO_4^0$, $MNTA^-$, $MHNTA^0$, $M(NTA)_2^{4-}$, M-humic, M-fulvic, MOH-humic, MOH-fulvic, M-acetate$^+$, $MEDTA^{2-}$, $MHEDTA^-$, $MHPO_4^0$. |
| Arsenic | $H_2AsO_3^-$, $H_2AsO_4^-$, $AsO_4^{2-}$, $AsO_4^{3-}$, $As^{3+}$ (most stable), $H_3AsO_3^0$, $H_3AsO_4^0$, $HAsO_3^{2-}$, $HAsO_3^{2-}$, Monomethylarsonic Acid, Monomethylarsonous acid, Dimethylarsinic acid, Dimethylarsinous acid, Trimethylarsine oxide, Tetramethylarsonium, Dimethylarsenoethanol, Arsenobetaine and Arsenocholine, Arsenosugars |
| Chromium | $Cr^{3+}$, $HCrO_4^-$, $H_2CrO_4^0$, $Cr_2O_7^{2-}$, $CrO_4^{2-}$, $Cr(OH)^{2+}$, $Cr(OH)_2^+$, $CaCrO_4^0$, Cr-(acetate)$_2^0$, $Cr(NH_3)_2^{3+}$, $CrO_3HPO_4^{2-}$, Cr(III)-fulvic, Cr(III)-humic |
| Mercury | $Hg^+$, $Hg^{2+}$ (most stable), $HgCl^+$, $HgCl_2^0$, $HgCl_3^-$, $HgOH^+$, $HgSO_4^0$, $Hg(SO_4)_2^{2-}$, Methylmercury, Ethylmercury, Phenylmercury, Haemoglobin-bound mercury, Carbonic anidrase-bound mercury, Glutathione-bound mercury and Cysteine-bound mercury, Hg-humic, Hg-fulvic |
| Selenium | $Se^{2-}$, $Se^+$, $Se^{2+}$, $Se^{4+}$, $Se^{6+}$, $HSeO_4^-$, $HSeO_3^-$, $H_2SeO_3^0$, $H_2Se$, Methylselenocysteine, Selenocystine, Selenomethionine, Selenosugars, Selenocysteine, Thioredoxin reductase-bound selenium, Glutathione peroxidase-bound selenium, Human serum albumin-bound selenium, Selenoprotein P, Selenocystamine and Trimethylselenonium. |
| Uranium | $UO_2^{2+}$, $UO_2Cl^+$, $UO_2(CO_3)_3^{3-}$, $UO_2CO_3^0$, $UO_2(OH)_3^-$, $UO_2(OH)_2^0$, $UO_2(OH)_4^{2-}$, $UO_2OH^+$, $UO_2PO_4^-$, $UO_2HPO_4^0$, $(UO_2)_2CO_3(OH)_3^-$, $UO_2Cl^+$, $UO_2SO_4^0$, $UO_2HEDTA^-$, $UOH^{3+}$, $U(OH)_2^{2+}$, $U(CO_3)_4^{4-}$, $USO_4^{2+}$, $UCl_3^+$, $UF_3^+$, $UO_2$-fulvic, $UO_2$-humic |

Some of the species formed may have greater bioavailability than others. The bioavailable species may be considered as labile species (i.e, chemically or biologically active), while non-bioavailable species may be considered non-labile. In one embodiment, the analyte solution may comprise labile metal ions and/or labile metalloid ions and non-labile metal ions and/or metalloid ions. Preferably, at least some of the labile metal ions and/or metalloid ions permeate through the ion-exchanger and are adsorbed by the adsorber particles. By subsequently separating and eluting the adsorber particles, it may be possible to produce a fractionated sample comprising the labile metal ions and/or labile metalloid ions. The concentration of these ions can be determined by further analysis, for instance, by mass spectrometry, potentiometry, or voltammetry.

Ion Exchanger

Any suitable ion exchanger may be employed. The ion exchanger may be a cation exchanger or an anionic exchanger. The ion exchanger may take the form of ion exchange matrix or ion exchange beads. Preferably, however, the ion exchanger comprises an ion exchange membrane.

An 'ion-exchange membrane' may be formed of a polymer membrane having fixed ionically charged groups. These ionically charged groups may be dispersed uniformly within the membrane. The ionically charged groups may be associated with mobile charges of opposite sign called 'counterions'. The counterions may be free to exchange with other counterions in the adjacent solutions. When the membrane has fixed negative charges, e.g., sulfonic acid groups, the membrane is a 'cation-exchange membrane', and the counterions are cations. In an external solution, mobile anions are associated with cations, but in a cation exchange membrane the charge balance is satisfied by the fixed negative charges. Therefore, anions in adjacent solutions tend to be excluded from the interior of the cation-exchange membrane. The ions with the same charge as the fixed charge in the membrane are called 'co-ions' and, provided that these species are sufficiently small to permeate the pores of the membrane, they are excluded from passing through the membrane.

Any suitable ion exchange membrane may be employed. Examples include perfluorosulfonic acid (e.g., Nafion-type) membranes; non-fluoride (e.g., SPEEK: sulfonated poly(ether ether ketone) membranes reinforced with PTFE; silicate membranes (e.g., zeolite based-membranes). These membranes have excellent chemical stabilities, permeability of ions such as protons, exhibit excellent separation of organic molecules and colloidal particles and long-term filtration stability. Ion diffusion through the membranes is dependent on a number of parameters such as the composition of the membrane (e.g., hydrated vs less hydrated monovalent or bivalent counter-ions), membrane thickness and solutions pH. The diffusion rates of monovalent vs multivalent ionic species through the membranes are controlled by varying the previously mentioned parameters. In some cases, functionalisation of the membranes is carried out to prevent diffusion of specific species. For example, nafion membrane may be functionalised with a cationic layer of polyethylenimine to reduce permeation of ethanol and multivalent ions such as vanadium.

When an ion exchange membrane is placed between two electrolyte solutions differing in composition, chemical gradient across the membrane is established allowing counter ions to pass through the membrane phase while the transport of the co-ions is hindered due to the electrostatic exclusion by the membrane surface. The counter-ions from the permeation solution diffuse through the membrane in order to establish electroneutrality in both sides of the membrane. This process leads to a build-up of concentration difference between co-ions in solution and on the membrane phase, leading to an osmotic pressure difference between the membrane and the bulk solution which is compensated by an additional potential across the membrane called Donnan potential. The Donnan potential may be measured electrochemically. The final distribution of ions involves three components: ions remaining in the feed solution; ions adsorbed to the membrane; and Donnan dialysed ions in the permeation solution. As long as the permeation volume is smaller than that of the feed solution, a substantial preconcentration of ions in the permeation can be achieved with almost complete removal of ions from sample.

Where the ion exchanger is a membrane, the membrane may have a molecular weight cut-off of less than 200 g $mol^{-1}$, preferably less than 100 g $mol^{-1}$, more preferably less than 70 g $mol^{-1}$. This allows the separation of reactive nano-colloids (>5 nm) and organic molecules or polymeric species >70 g $mol^{-1}$. This provides an additional layer of analysis where for example nanoparticles in water are separated at an initial stage of the separation process. Direct dissolution of these nanoparticles allows their quantification in the original sample (using total metal analysis). The retention of metal-organic or organometallic complexes may be used for their determination in a separate step. The membrane may be impermeable to bacteria and viruses. The membrane may also be impermeable to suspended particles, for example, of colloids such as silica.

Where the ion exchanger is a membrane, the membrane may have an average pore size of 10 to 50 nm, preferably 10 to 20 nm, more preferably 5 to 10 nm.

Where the ion exchanger is a membrane, the membrane may have a thickness of 50 to 200 microns, preferably 50 to 100 microns, more preferably 50 to 70 microns.

Device

As described above, the present invention provides a separation device. An example of such a device is now described, by way of example, with reference to FIG. 2.

Figure 2:
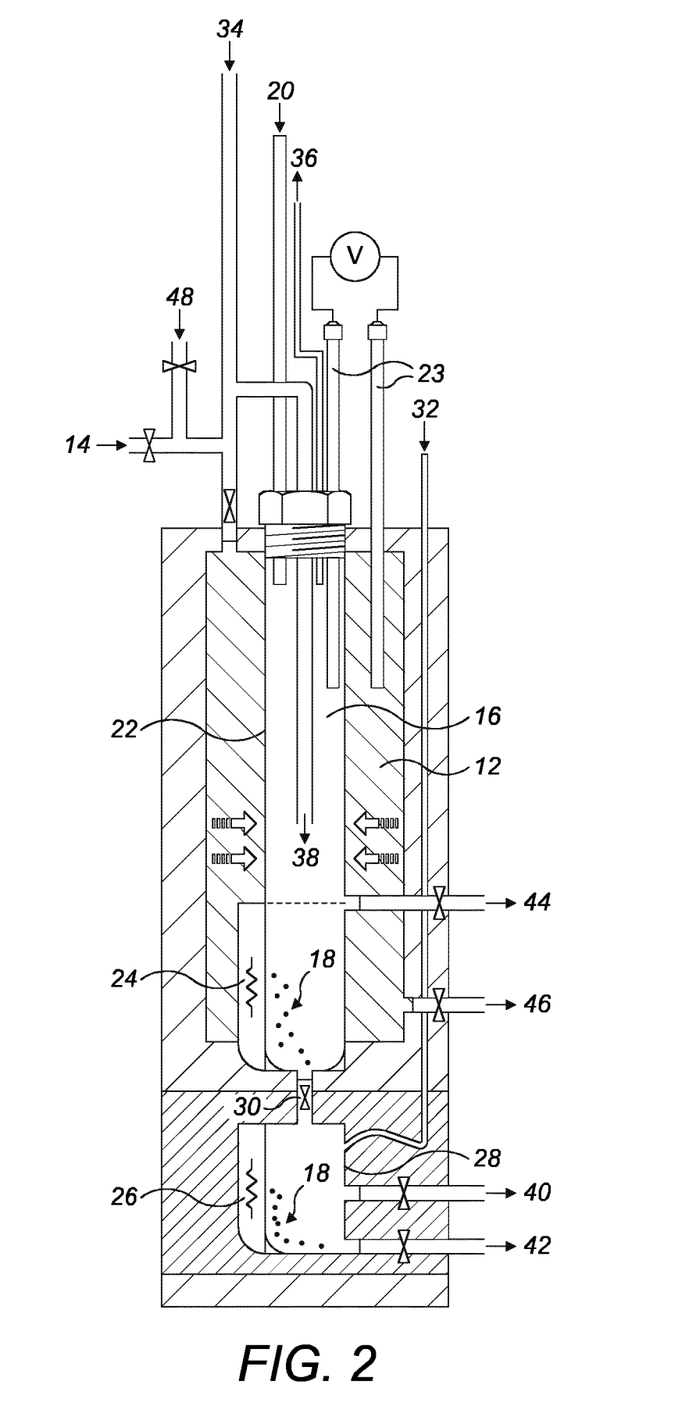
FIG. 2 is a schematic drawing of an example of a device that may be used in a method according to an example of the present invention.

The device 10 comprises an analyte chamber 12 having an inlet 14 for the introduction of an analyte solution into the analyte chamber 12. The analyte chamber 12 may have a volume of 10 to 100 ml, preferably 10 to 50 ml, more preferably 10 to 30 ml. The device 10 also comprises a permeate chamber 16 containing a draw solution comprising magnetic particles 18 dispersed in a liquid carrier. The permeate chamber 16 may comprise an inlet 20 for the introduction of draw solution into the permeate chamber 16. Alternatively, the permeate chamber 16 may be pre-filled with draw solution. The device 10 includes an ion exchanger 22, for example, in the form of an ion exchange membrane separating the analyte chamber 12 from the permeate chamber 16. The Donnan potential across the membrane may be measured by electrodes 23 positioned on either side of the membrane.

An electromagnet 24 is positioned downstream of the permeate chamber 16. The electromagnet 24 is operable to apply a magnetic field downstream of the permeate chamber 16, for example, in a separation zone in order to separate magnetic particles 18 from at least part of the draw solution in the permeate chamber 16.

The device 10 may also include a further electromagnet 26 downstream of the first electromagnet 24. The further electromagnet may be operable to localise magnetic particles 18 from the separation zone in an elution zone 28. The elution zone 28 may be separated from the separation zone via a valve 30. The elution zone 28 may be provided with an inlet 32 for the introduction of an eluent, for example, an acid (e.g. nitric acid).

The device 10 may measure 10 to 300 mm in length, preferably 20 to 200 mm, more preferably 50 to 150 mm in length. The device 10 may measure 10 to 100 mm in width and/or depth, preferably 20 to 80 mm, more preferably 30 to 50 mm in width and/or depth.

In operation, an analyte sample may be introduced into the analyte chamber 12 of the device 10 via inlet 14. If not already in the permeate chamber 16, a draw solution containing magnetic particles 18 may be introduced into the permeate chamber 16 via inlet 20. Optionally, an inert atmosphere may be maintained within the device 10 by introducing an inert gas (e.g. argon) via inlet 34. Excess gas, if any, may be vented via outlet 36.

In one example, the analyte sample may contain ionic species of e.g. a metal and/or metalloid. As the draw solution contains a lower concentration of the metal and/or metalloid, a concentration gradient is established across the ion exchanger 22 (e.g. ion exchange membrane). The ion exchanger 22 allows ionic species of a particular charge to permeate from the analyte chamber 12 into the permeate chamber 16. This permeation across the ion exchanger 22 occurs within an ion exchange zone 38 within the device 10. In the permeate chamber 16, the ionic species are adsorbed onto the magnetic particles 18. This adsorption helps to enhance the permeation rate of metal and/or metalloid species of a particular charge across the ion-exchanger, allowing a fractionated analyte sample 40 to be produced at an improved rate (see below). The adsorption also allows a more concentrated sample of the ionic species to be produced.

Treated analyte sample may be removed from the analyte chamber via outlet 46.

The magnetic particles 18 having the ionic species adsorbed thereon may be separated from at least part of the draw solution, for example, by turning on the first electromagnet 24. Thereafter, the second electromagnet 26 may be turned on (and the first electromagnet 24 optionally turned off) to draw the magnetic particles 18 from the separation zone and localise them in the elution zone 28. In the elution zone 28, the adsorbed ionic species may be eluted by contact with an eluent (e.g. nitric acid) to produce an eluate or fractionated analyte sample 40, which may be withdrawn e.g. for further analysis (not shown). Further analysis may be carried out using mass spectrometry (e.g. ICPMS). Colorimetric or electrochemical analytical techniques may alternatively or additionally be performed. Eluted draw solution may be withdrawn as waste via outlet 44. Spent draw solution, for example, substantially free of magnetic particles may be withdrawn via outlet 44 at a location upstream of the first magnet 24.

In a preferred embodiment, fresh draw solution may be introduced into the permeate chamber 16 in order to maintain a desired concentration gradient across the ion exchanger 22. Waste draw solution may be withdrawn via outlet 42. The whole system may be flushed with acid and/or deionised water via inlet 48 and waste solution drawn via outlet 42.

In one embodiment, the nature of the ion exchanger 22 may be varied depending on the analyte sample being analysed.

In one embodiment, the nature of the magnetic particles may be varied depending on the ionic species that are to be adsorbed. Alternatively or additionally, the pH of the draw solution may be varied to tailor the selectivity of adsorption to target species.

The device 10 may be operated in an inert or temperature controlled environment. This may be important for the separation of redox sensitive species.

Figure 3:
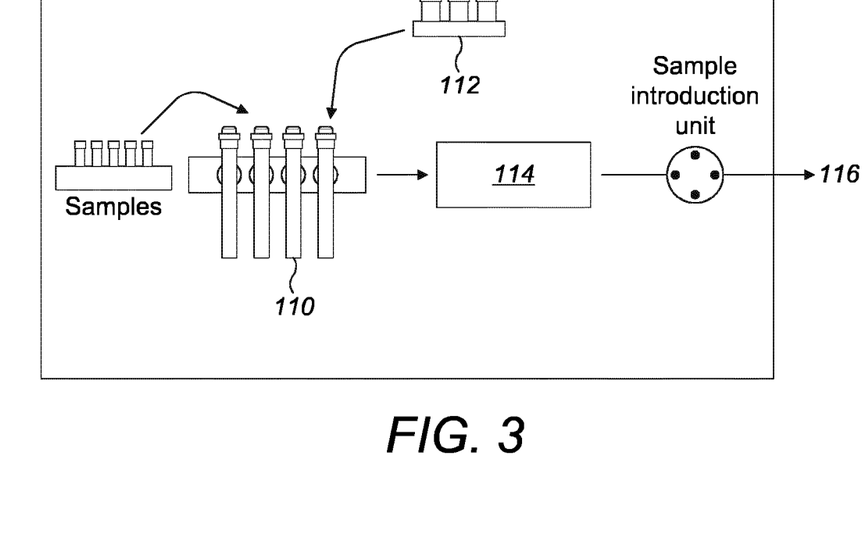
FIG. 3 is a schematic drawing of a system that may be employed to carry out one embodiment of the method of the present disclosure.

FIG. 3 illustrates a schematic diagram of a system that may be employed to carry out one embodiment of the method of the present disclosure. The system comprises a kit 100 according to one embodiment of the present invention. The kit 100 comprises a plurality of devices 110 according to the present disclosure. An example of a suitable device 110 is the device 10 that is described above and illustrated in FIG. 1. However, it will be understood that devices of a different configuration may be employed.

In one embodiment, the draw solution introduced into each device 110 may contain the different magnetic particles. A library 112 of pre-formed magnetic particles may be provided. By altering the nature of the magnetic particles, for example, by varying their functionalisation, each device may be designed to target specific species or classes of species within the analyte solution. Alternatively or additionally, the pH of the draw solution may be varied so that specific species or classes of species may be targeted by each device.

For example, in a sample containing inorganic arsenic namely arsenite ($As^{III}$) and arsenate ($As^{V}$), its metabolites monomethylarsonic acid (MMA) and dimethylarsinic acid (DMA) and the nontoxic arsenicals of marine food origin, namely arsenobetaine (Asbet) and arsenocholine (Aschol), thearsenic species may have very different acidity constants. This may allow their separation by careful control of pH. At neutral pH, arsenate (pKa1=2.3), MMA (pKa1=3.6), DMA (pKa=6.2) are present as anions, whereas the tetramethylarsonium (($CH_3)_4As^+$) is present as a cation and arsenocholine (($CH_3)_3As^+CH_2CH_2OH$) is a permanently cationic species independent of pH. Arsenobetaine (($CH_3)_3As^+CH_2COO^-$) is a zwitterion and the arsenious acis (pKa1=9.3) is an uncharged (unionised) species. Thus, the trivalent arsenic species ($As^{III}$, $MMA^{III}$, $DMA^{III}$) may be selectively determined. The sum of trivalent and pentavalent arsenic species ($As^V$, $MMA^V$, $DMA^V$) could be determined at acidic pH (<1). The use of cation-exchange or anion-exchange membrane allows the separation of cationic from anionic arsenic species. The organic arsenic species has different adsorption tendencies towards reactive oxide surfaces from inorganic species and allowing further fractionation possibilities where for example $As^{III}$ alone could be selectively separated from $MMA^{III}$ and $DMA^{III}$ in the permeation solution by adsorption on e.g. magnetite particles.

The system may be used to produce a selection of fractionated samples. The fractionated samples may comprise a mixture of ionic species, for example, a mixture of ionic species of a metal or metalloid element. Alternatively, the fractionated sample may be a speciated sample, for example, consisting essentially of a single chemical species. The fractionated samples 114 may be further analysed, for example, by ICPMS 116.

EXAMPLES

Example 1: Simultaneous Fractionation and Determination of Metals

Figure 4:
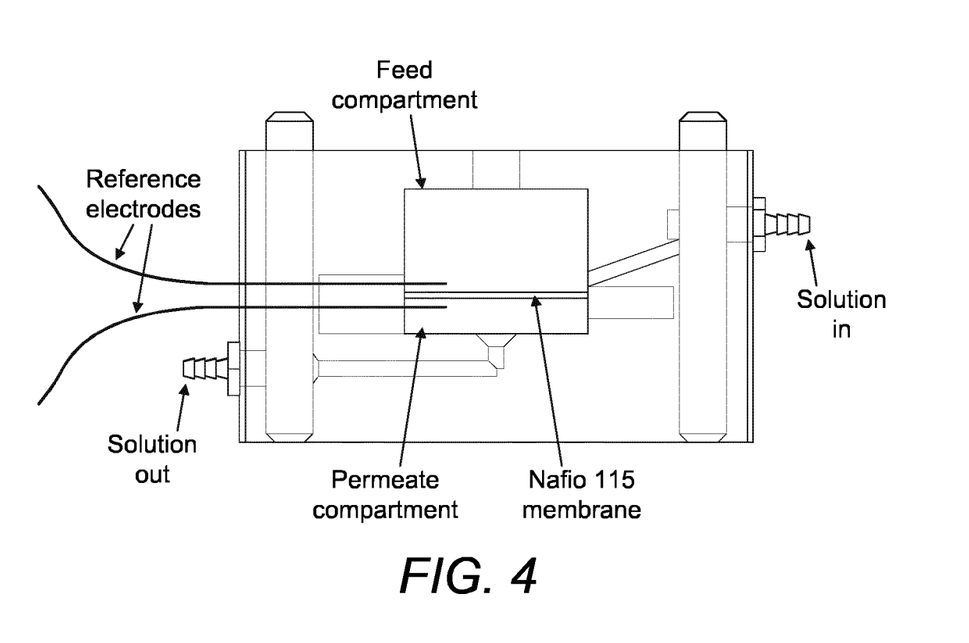
FIG. 4 is a schematic diagram of a device used in the method described in Example 1.

A simple two compartment cell as that shown in FIG. 4 was constructed from Plexiglas body and PTFE internal components. The starting feed (analyte) solution (V=20 ml) containing mixed metals (Cd, Co, Cu, Ni and Pb) was prepared from nitrate salts in a background solution of 0.01 M $NaNO_3$. The starting concentration of each metal in the feed solutions was 1 ppm whereas the permeation solution (V=2 ml) contained only 0.01M $NaNO_3$ at t=0. The two compartments were separated by a permeation ionomeric Nafion-115 (thickness=127 μm; A=20 cm$^2$) cation-exchange membrane. The Nafion membrane was cleaned in boiling $H_2SO_4$, washed in deionised water and soaked in 1 M $Mg(NO_3)_2$ or $Ba(NO_3)_2$ for few days in order to obtain a fully Mg- or Ba-exchanged membrane. The ionic diffusion through the membrane was monitored for at least 2 h by removing small solutions (~100 μL) from the permeate compartment and analysis for target metals using ICP-MS.

In a different experiment, maghemite nanoparticles were synthesized by coprecipitation from a mixture of $FeCl_3$ and $FeSO_4$ solution (molar ratio 2:1) under $N_2$ atmosphere and with a dropwise addition of ammonia aqueous solution with stirring. The resulting magnetite nanoparticles were washed immediately with distilled water and oxidized into maghemite by air at 90° C. The final maghemite nanoparticles were then thiolated by the addition of meso-2,3-dimercaptosuccinic acid (DMSA) in an aqueous solution at pH 4. A 100 mg of the obtained DMSA-coated maghemite particles were then add to the permeation compartment in FIG. 4 and the above experiment was repeated.

Figure 5A:
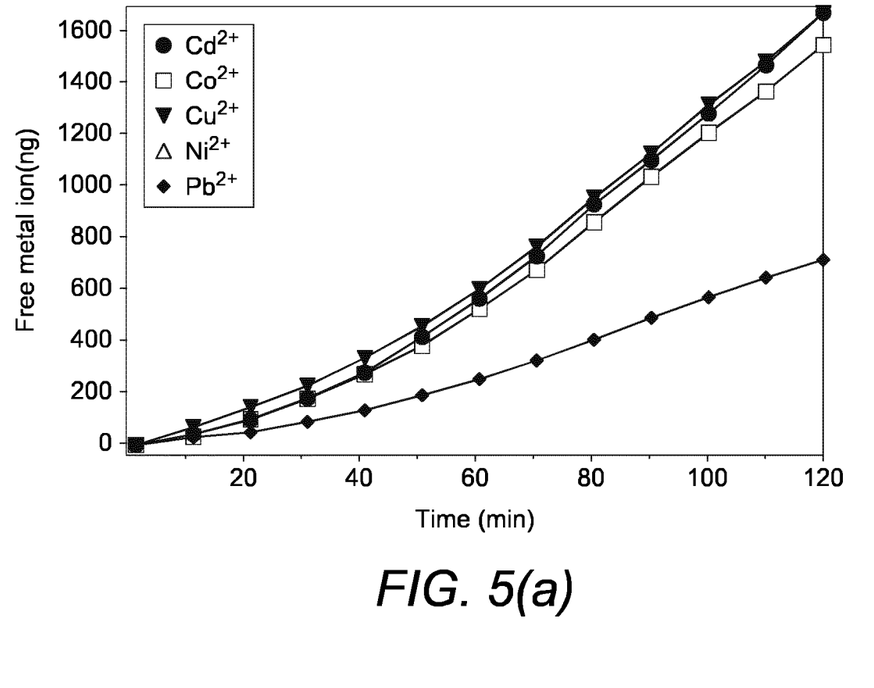
FIG. 5 demonstrates the effect of using suitable adsorber particles in increasing the elution performance of the separation method and shows how the concentration of eluted free metal ions varies with time as observed in Example 1.
Figure 5B:
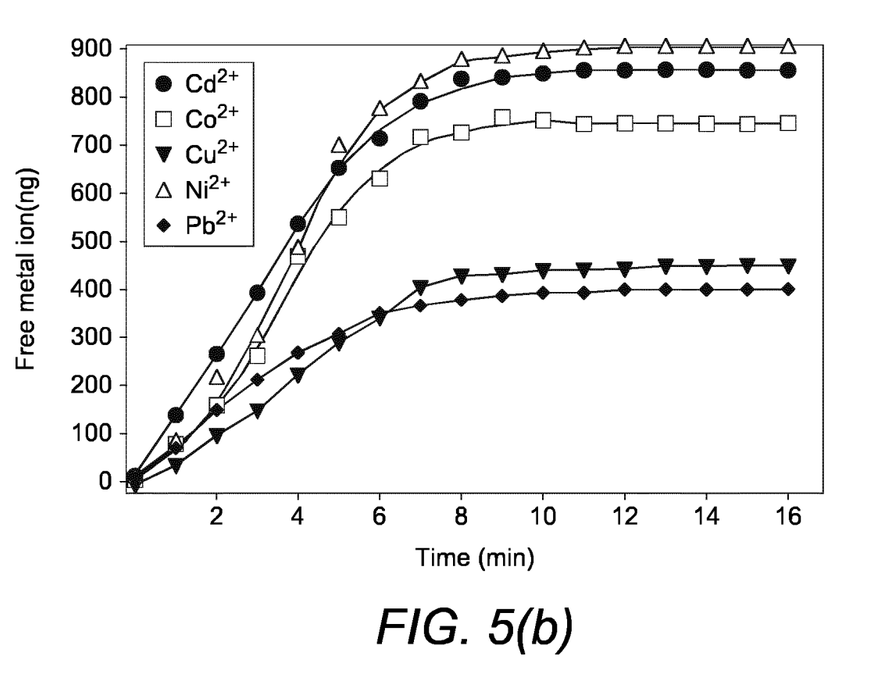

The metal response curves of (a) nano-particle-free (b) DMSA-coated maghemite solution inside the permeation compartment are shown in FIG. 5. Note the rapid response time of the instrument (b), allowing determination of free ion concentrations in minutes, rather than hours for more traditional approaches (a). The plateau values shown in (b) are used for accurate assessment of correct metal concentrations which are never achieved in the examples of traditional methods.

This example demonstrates that the addition of adsorber particles to the permeation electrolyte can enhance both the flux of the metal ions and the selectivity of this process. This is due to the fact that free metal ions entering the permeation solution are immediately complexed by the carboxyl groups (—COOH) and thiol groups (—SH) of the DMSA coating the maghemite nanoparticles. The large concentration gradient (as a driving force) is thus maintained for metal transport in such system.

Figure 6:
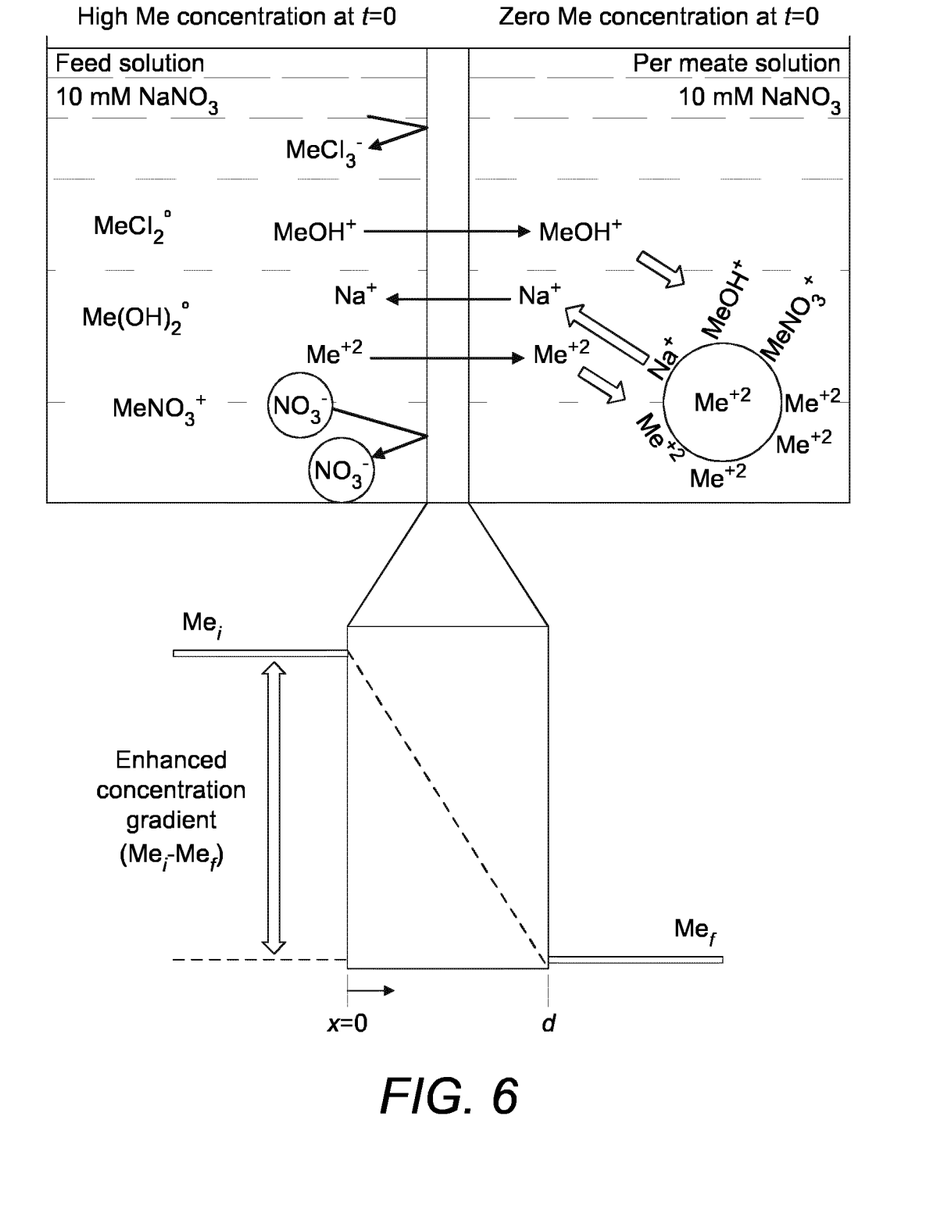
FIG. 6 is a schematic illustration of how the negative charge and electric Donnan potential in the membrane can affect transport across the membrane.

Note that the negative charge and electric Donnan potential in the membrane promote the transport of the positively charged cationic species whereas the negatively charged anionic species are largely excluded from entering the membrane and their transport to the permeation side is strongly retarded. This is illustrated by way of example with reference to FIG. 6. FIG. 6 illustrates an example of ion (Me) transport through a cation-exchange membrane in the presence of a strong chelating surface (adsorber particles) in the acceptor side in dilute $NaNO_3$. The donor solution shows metal complexation with nitrate and hydroxides. The nanoparticle sphere on the acceptor side (right) represents nanoparticles as a zero sink of metal species. The thin-film membrane of thickness d, is drawn out of scale for clarity.

Figure 7:
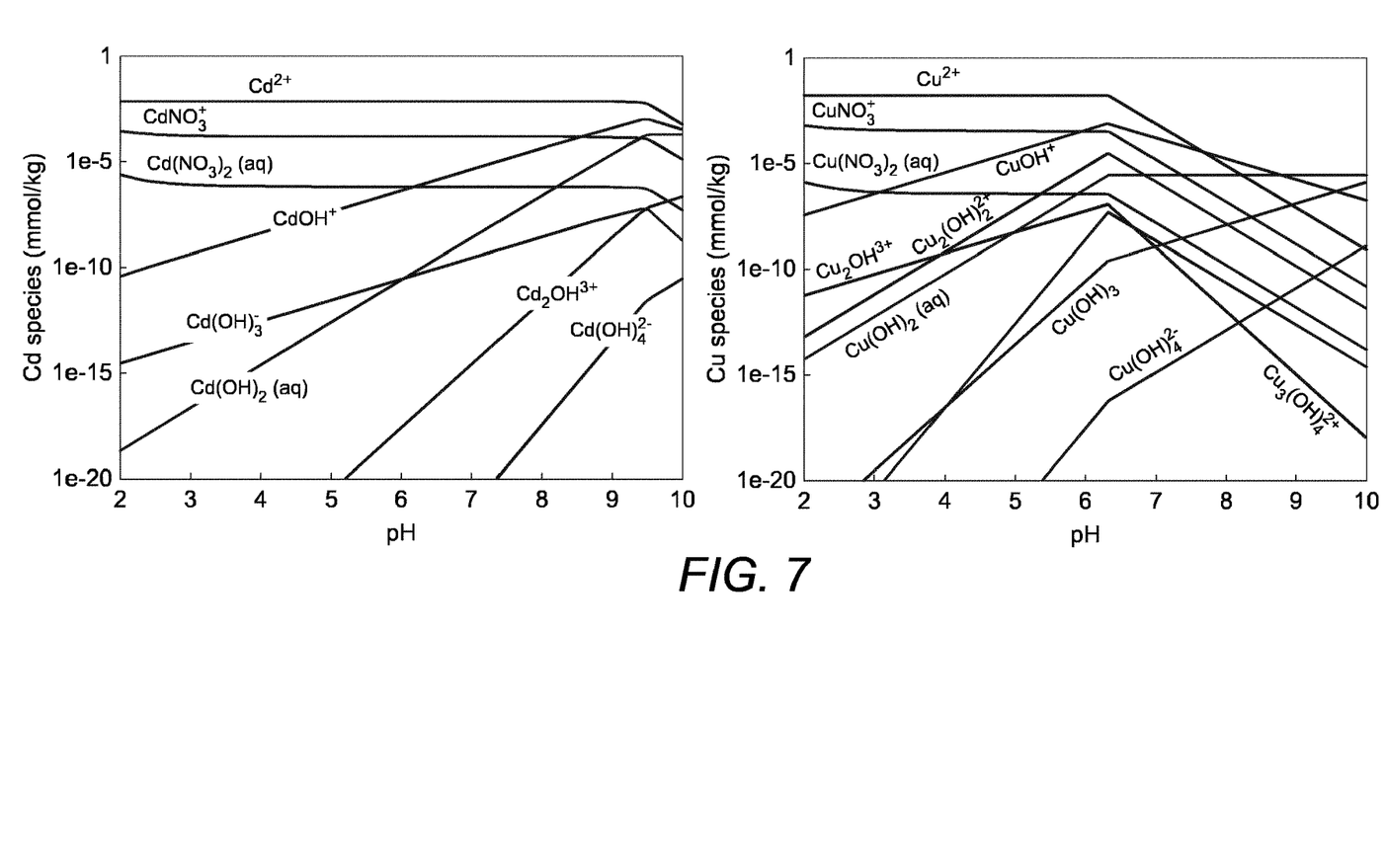
FIG. 7 illustrates a thermodynamic simulation of the Cd and Cu speciation in nitrate solution, showing the distribution of the Cd and Cu species over a wide pH range.

In Example 1, the metals Cd, Ni, Cu, Co, and Pb form weak complexes with nitrates. Hence almost all metals are present as free ions in solution. Accordingly, the plot in FIG. 5 represents the transport of the free metal ions $Cd^{2+}$, $Ni^{2+}$, $Cu^{2+}$, $Co^{2+}$, and $Pb^{2+}$. A thermodynamic simulation of the Cd and Cu speciation in nitrate solution is given in FIG. 7 showing the distribution of the Cd and Cu species over a wide pH range.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for separating ionic species from an analyte solution to form a fractionated sample, the method comprising
   contacting the analyte solution with an ion-exchanger that is selectively permeable to ionic species of either a positive or negative charge,
   contacting an opposing side of the ion-exchanger with a draw solution, wherein the draw solution comprises adsorber particles dispersed in a liquid carrier, wherein the adsorber particles are magnetic particles,
   establishing a concentration gradient across the ion-exchanger to allow at least some ionic species from the analyte solution to permeate through the ion-exchanger to the draw solution,
   adsorbing ionic species that permeate from the analyte solution onto the adsorber particles,
   separating adsorber particles having the ionic species adsorbed thereto from at least part of the draw solution by the application of a magnetic field, and
   eluting the ionic species from the separated adsorber particles to form a fractionated analyte sample comprising eluted ionic species.

2. A method as claimed in claim 1, wherein the magnetic particles are separated from at least part of the draw solution by the application of a first magnetic field, and then localised in an elution zone by the application of a second magnetic field, wherein elution of the ionic species from the separated adsorber particles takes place in the elution zone.

3. A method as claimed in claim 2, wherein the magnetic particles have magnetic cores or the magnetic particles have a core-shell structure.

4. A method as claimed in claim 1, wherein the ionic species are metal ions or metalloid ions.

5. A method as claimed in claim 4, wherein the metal ions or metalloid ions are ions of toxic heavy metals or metalloids.

6. A method as claimed in claim 5, wherein the toxic heavy metals or metalloids are selected from at least one of cadmium, mercury, lead, manganese, chromium, cobalt, nickel, copper, vanadium, zinc, silver, arsenic, selenium, antimony and thallium.

7. A method as claimed in claim 1, wherein the analyte solution comprises labile metal ions and/or metalloid ions and non-labile metal ions and/or metalloid ions, and wherein at least some of the labile metal ions and/or metalloid ions permeate through the ion-exchanger and are adsorbed by the adsorber particles.

8. A method as claimed in claim 1, wherein the fractionated or speciated analyte sample is further analysed colorimetrically, electrochemically or using mass-spectroscopy.

9. A method as claimed in claim 1, wherein the ion-exchanger is an ion-exchange membrane or comprises ion exchange resin particles.

10. A method as claimed in claim 1, which comprises measuring the difference in electrical potential between the two sides of the ion-exchanger.

11. A method as claimed in claim 1, wherein the method comprises:
providing a plurality of separation devices, each separation device comprising an ion-exchanger that is selectively permeable to ionic species of either a positive or negative charge;
contacting a portion of the analyte solution with the ion-exchanger in each separation device, wherein the adsorber particles are magnetic particles,
contacting a draw solution comprising adsorber particles dispersed in a liquid carrier with an opposing side of the ion-exchanger in each separation device,
establishing a concentration gradient in each separation device to allow at least some ionic species to permeate through each ion-exchanger into each draw solution,
adsorbing the ionic species that permeate through each ion-exchanger onto the adsorber particles in each draw solution,
separating the adsorber particles from at least part of the remainder of its respective draw solution by the application of a magnetic field, and
eluting the adsorbed ionic species from the separated adsorber particles to form a plurality of fractionated analyte samples, each fractionated analyte sample comprising eluted ionic species.

12. A method as claimed in claim 11, wherein the ion-exchanger in at least two of the separation devices is different.

13. A method as claimed in claim 11, wherein the adsorber particles in at least two of the separation devices is different.

14. A method as claimed in claim 11, wherein the draw solution in at least two of the separation devices has a different pH.

15. A separation device comprising
an analyte chamber having an inlet for the introduction of an analyte solution into the analyte chamber,
a permeate chamber having an inlet for the introduction of a draw solution comprising magnetic particles dispersed in a liquid carrier into the permeate chamber,
an ion exchanger separating the analyte chamber from the permeate chamber, and
an electromagnet positioned downstream of the permeate chamber, the electromagnet being operable to apply a magnetic field downstream of the permeate chamber to separate the magnetic particles from at least part of the draw solution in the permeate chamber.

16. A device as claimed in claim 15, which further comprises an elution chamber downstream of the permeate chamber, wherein the elution chamber comprises an inlet for the introduction of an eluant into the elution chamber and an outlet for removing a fractionated analyte sample comprising eluted ionic species from the elution chamber.

17. A device as claimed in claim 15, which comprises a first electromagnet that is operable to apply a magnetic field downstream of the permeate chamber to separate the magnetic particles from at least part of the draw solution in the permeate chamber, and a second electromagnet downstream of the first electromagnet that is operable to locate the separated magnetic particles in the elution chamber.

18. A separation device as claimed in claim 15, wherein the analyte chamber has a volume of 1 to 5 $cm^3$.

19. A kit comprising an array of separation devices as claimed in claim 15.

20. A kit as claimed in claim 19, which further comprises a plurality of sets comprising magnetic particles, wherein each set comprises magnetic particles that are functionalised in a different way.

* * * * *